(12) United States Patent
Tsotsis

(10) Patent No.: US 10,253,192 B2
(45) Date of Patent: Apr. 9, 2019

(54) BARRIER COATING SYSTEM

(71) Applicant: THE BOEING COMPANY, Chicago, IL (US)

(72) Inventor: Thomas K. Tsotsis, Santa Ana, CA (US)

(73) Assignee: THE BOEING COMPANY, Chicago, IL (US)

( * ) Notice: Subject to any disclaimer, the term of this patent is extended or adjusted under 35 U.S.C. 154(b) by 273 days.

(21) Appl. No.: 15/250,040

(22) Filed: Aug. 29, 2016

(65) Prior Publication Data

US 2018/0057694 A1 Mar. 1, 2018

(51) Int. Cl.

| | |
|---|---|
| *B32B 9/00* | (2006.01) |
| *C09D 5/24* | (2006.01) |
| *C09D 171/00* | (2006.01) |
| *C09D 133/24* | (2006.01) |
| *C09D 179/08* | (2006.01) |
| *C09D 179/00* | (2006.01) |
| *C09D 183/04* | (2006.01) |
| *C09D 5/00* | (2006.01) |
| *B32B 9/04* | (2006.01) |

(52) U.S. Cl.
CPC ............... *C09D 5/24* (2013.01); *C09D 5/00* (2013.01); *C09D 133/24* (2013.01); *C09D 171/00* (2013.01); *C09D 179/00* (2013.01); *C09D 179/08* (2013.01); *C09D 183/04* (2013.01); *B32B 9/045* (2013.01); *B32B 2383/00* (2013.01); *B32B 2605/18* (2013.01)

(58) Field of Classification Search
CPC .... B32B 9/00; B32B 2383/00; B32B 2605/18
See application file for complete search history.

(56) References Cited

U.S. PATENT DOCUMENTS

| | | | | |
|---|---|---|---|---|
| 7,811,669 | B2* | 10/2010 | Fujii | ............... C23C 14/0021 |
| | | | | 427/255.18 |
| 8,778,498 | B1* | 7/2014 | Tsotsis | ................. B32B 37/144 |
| | | | | 428/411.1 |
| 2006/0093758 | A1* | 5/2006 | Sakakura | ............... H05B 33/04 |
| | | | | 428/1.6 |
| 2009/0291293 | A1* | 11/2009 | Sakakura | ............ H01L 51/0097 |
| | | | | 428/323 |

(Continued)

OTHER PUBLICATIONS

M. A. Belcher, et al., Laser Surface Preparation for Adhesive Bonding of T-6Al-4V, U.S. Government, 2010, 11 pages.

(Continued)

*Primary Examiner* — Rip A Lee

(74) *Attorney, Agent, or Firm* — Patterson + Sheridan, LLP

(57) ABSTRACT

The present disclosure provides a barrier-coating structure that includes a polymer-matrix composite having a first surface and a second surface. The barrier-coating structure includes a flexible layer having a first surface and a second surface and a sol-gel layer having a first surface and a second surface. The first surface of the flexible layer contacts the second surface of the flexible layer. The barrier-coating structure includes a barrier layer having a first surface and a second surface. The sol-gel and/or the barrier layer may comprise one or more reactive substituents. The first surface of the barrier layer may be a laser-ablated surface.

20 Claims, 5 Drawing Sheets

(56) References Cited

U.S. PATENT DOCUMENTS

| | | | |
|---|---|---|---|
| 2011/0297661 A1* | 12/2011 | Raghavan | H05B 3/84 219/203 |
| 2014/0318689 A1 | 10/2014 | Tsotsis | |
| 2015/0343753 A1* | 12/2015 | Krieg | B32B 37/144 428/418 |
| 2016/0138156 A1* | 5/2016 | Tsotsis | C23C 16/26 428/212 |

OTHER PUBLICATIONS

Hieu Truong, et al., Hybrid Interfaces in High Temperature Hybrid Composites, Dwight Look College of Engineering, Texas A&M University, 27 pages.

* cited by examiner

BARRIER COATING SYSTEM

FIELD

Aspects of the present disclosure generally relate to coatings for composites and methods for making composites.

BACKGROUND

Polymer-matrix composites (PMCs), such as high-temperature polymer-matrix composites (HTPMCs), are used in the aircraft and aerospace industry for the weight reduction they offer when used as a substitute for metal components. However, exposure to high temperatures (e.g., 350 degrees Fahrenheit to 700 degrees Fahrenheit) can change the mechanical properties of the PMCs and HTPMCs and may cause oxidation of the PMCs and HTPMCs. For example, some HTPMCs have lifetimes of approximately between 1,000 hours and 3,000 hours at such elevated temperatures. In an attempt to extend the lifetime of PMCs and HTPMCs, barrier coatings or layers which prevent, reduce, or inhibit the permeation of a selected substrate with a gas, vapor, and/or chemical have been developed, such as ceramic-based coatings, for use with PMCs and HTPMCs. However, ceramic-based barrier coatings and metal-based barrier coatings have coefficients of thermal expansion (CTEs) that are sufficiently different from PMCs and HTPMCs and can cause strain mismatch between the ceramic-based barrier coating and the PMC or HTPMC substrate. Strain mismatch may cause the coating to crack or spall, thereby exposing the substrate to the environment, which may result in oxidation of the PMC or HTPMC. Furthermore, sufficiently different coefficients of thermal expansion between the coating and PMC/HTPMC may cause delamination of the coating from the PMC/HTPMC.

In addition, oxygen-barrier coatings for use with PMCs and HTPMCs may be affected by use at elevated temperatures in the 350-degree Fahrenheit to 700-degree Fahrenheit range for extended periods by cracking, spalling, delamination, and/or eroding.

There is a need in the art for barrier-coating structures and methods providing reduced delamination and improved protection of a PMC/HTPMC from oxidation.

SUMMARY

In some aspects, a barrier-coating structure includes a polymer-matrix composite having a first surface and a second surface. The barrier-coating structure includes a flexible layer having a first surface and a second surface and a sol-gel layer having a first surface and a second surface. The first surface of the flexible layer contacts the second surface of the flexible layer. The barrier-coating structure includes a barrier layer having a first surface and a second surface.

In some aspects, a method of making a barrier-coating structure includes laser ablating a first surface of a barrier layer to form a laser-ablated barrier surface. The method includes contacting a first surface of a sol-gel layer with the laser-ablated barrier surface and contacting a first surface of a flexible layer with a second surface of the sol-gel layer. The method includes contacting a first surface of a polymer-matrix composite layer with a second surface of the flexible layer.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this present disclosure and are therefore not to be considered limiting of its scope, for the present disclosure may admit to other equally effective aspects.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

The present disclosure relates to a dense barrier-coating structure and method that protects polymer-matrix composites (PMCs) and high-temperature polymer-matrix composites (HTPMCs) from thermo-oxidation. As used herein, "dense" includes that oxygen and moisture cannot penetrate the coating. Structures and methods of the present disclosure may be disposed on aircraft, spacecraft, watercraft, and other craft, engine and blown-flap, exhaust-washed structures, warm-structure components for high-performance supersonic, hypersonic, and space re-entry vehicle structures, and propulsion structures such as power-generation turbines, vehicle engines, alternative-energy applications, and related technologies.

Figure 1:
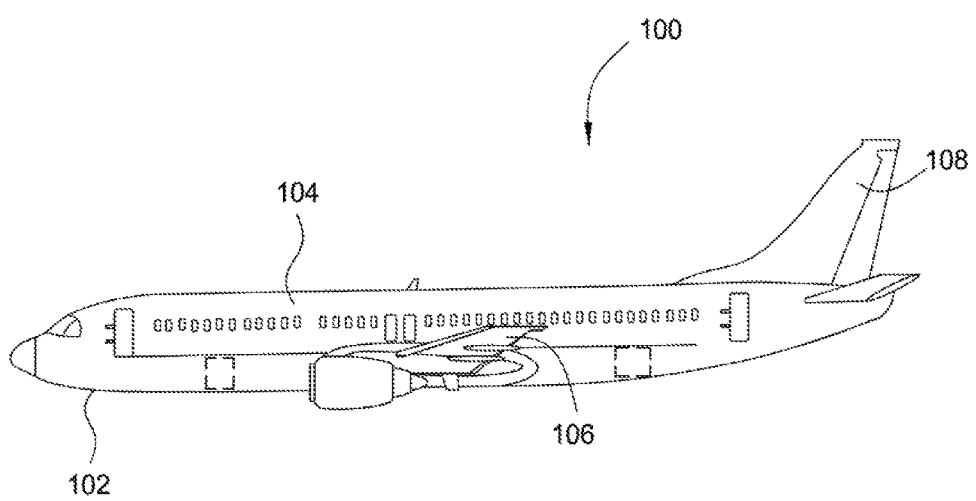
FIG. 1 is an aircraft comprising structures and methods according to an aspect of the present disclosure.

FIG. 1 is an aircraft comprising barrier structure(s) and methods according to an aspect of the present disclosure. As shown in FIG. 1, aircraft 100 includes an aircraft structure 102 including aircraft components such as an elongated body 104, a wing 106 extending laterally from the body 104, and a tail 108 extending longitudinally from the body 104. Barrier structures of the present disclosure may be disposed on one or more aircraft components.

Figure 2:
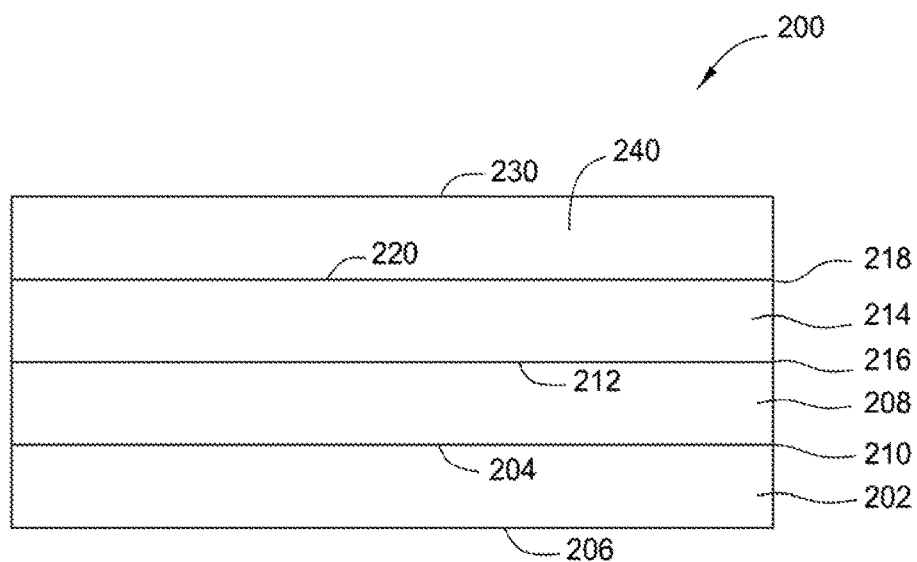
FIG. 2 is a barrier-coating structure according to an aspect of the present disclosure.

FIG. 2 is a dense barrier-coating structure according to an aspect of the present disclosure. As shown in FIG. 2, dense barrier-coating structure 200 includes a dry polymer-matrix composite (PMC) substrate 202 having a first coefficient of thermal expansion (CTE). As described herein, "coefficient of thermal expansion" includes the change in dimension per unit change in temperature for a given material. Different materials have different rates of expansion. The lower the coefficient of thermal expansion, the less change in the size of the material when subjected to temperature changes. The coefficient of thermal expansion is typically measured in the unit $k^{-1}$ expansion in parts per million (ppm) per degrees Celsius (° C.) in temperature. The PMC substrate 202 may include any suitable PMC, such as a polyimide HTPMC, a bismaleimide HPTMC, inorganic polymers, other high-temperature polymers such as polybenzoxazoles, polybenzoxazines, or polyetheretherketones. The CTEs of polyimides may be between about 20 ppm/° C. and about 70 ppm/° C., for example about 20 ppm/° C., about 40 ppm/° C., about 60 ppm/° C. The CTEs of typical inorganic polymers may be between about 5 ppm/° C. and about 300 ppm/° C., such as between about 100 ppm/° C. and about 200 ppm/° C., for example about 100 ppm/° C., about 150 ppm/° C., about 200 ppm/° C., about 250 ppm/° C. The CTEs of typical organic polymers may be between about 15 ppm/° C. and about 100 ppm/° C., such as between about 40 ppm/° C. and about 80 ppm/° C., for example about 40 ppm/° C., about 50 ppm/° C., about 60 ppm/° C., about 70 ppm/° C., about 80 ppm/° C. PMC substrate 202 has a first surface 204 and a second surface 206. Dense barrier-coating structure 200 further includes a flexible layer 208 that is substantially or completely free of water. Flexible layer 28 may include low-modulus-of-elasticity polymers comprising elastomers, silicones, silanes, siloxanes, silazanes, or other suitable low-modulus-of-elasticity materials. Flexible layer 208 has a first surface 210 and a second surface 212. First surface 210 of flexible layer 208 contacts first surface 204 of PMC substrate 202. First surface 204 of PMC substrate 202 may be treated to promote bonding between flexible layer 208 and PMC substrate 202.

A polymer of a PMC substrate and/or polymer of a flexible layer may have one or more reactive substituents for bonding a surface of a PMC substrate with a surface of a flexible layer, such as first surface 204 of PMC substrate 202 with first surface 210 of flexible layer 208. The term "reactive substituent" includes a chemical moiety capable of undergoing a chemical reaction under reaction conditions. Reactive substituents include polymer endcaps. Reactive substituents include phthalonitrile, phenylethynyl, glycidyl, anhydride, and amine. For example, a flexible layer has a phenylethynyl-substituted silicone polymer and a PMC has an amine-substituted polymer. Phenylethynyl-substituted silicone polymer may be prepared by reacting amine-containing silicone (e.g., Xiameter from Dow Corning) with a phenylethynyl phthalic anhydride. The flexible layer is deposited onto the PMC, followed by curing, which promotes nucleophilic reaction of the amine moieties of the PMC polymer at least at the second surface of the PMC layer with the electrophilic phenylethynyl moieties of the silicone at least at the first surface of the flexible layer. As another example, a flexible layer has an amine-substituted silicone polymer (e.g., Xiameter from Dow Corning) and a PMC has an phenylethynyl-substituted polymer. The flexible layer is deposited onto the PMC, followed by curing, which promotes nucleophilic reaction of the amine moieties at least at the first surface of the flexible layer polymer with the electrophilic phenylethynyl moieties at least at the second surface of the PMC polymer. Covalent bonding of the PMC with the flexible layer reduces or eliminates delamination of the flexible layer from the PMC.

Additionally or alternatively, a first surface of a PMC, such as first surface 204 of PMC substrate 202, may be treated to promote bonding reactivity with the first surface 210 of the flexible layer 208 by: chemical etching to promote chemical compatibility PMC substrate 202 and flexible layer 208; treating the surface with acid or base to enhance the reactivity of the surface; treating the surface with a polar or nonpolar compound to adjust surface polarity; functionalizing the surface by treating the surface with a reactant having functional groups to form a surface with reactive functional groups; abrading the surface; or a combination of such treatments to promote durability and effectiveness of the bond between the PMC substrate and the flexible layer or between adjacent flexible layers. As noted above, a flexible layer may include low-modulus-of-elasticity material comprising elastomers, silicones, silanes, siloxanes, silazanes, or other suitable low-modulus-of-elasticity materials. As used herein, a modulus of elasticity includes the Young's Modulus defined as the ratio of the uniaxial stress over the uniaxial strain in the range of stress in which the ratio of stress (nominal) to corresponding strain is linear when a force is applied to it. The modulus of elasticity is typically measured pounds per square inch (psi). The modulus of elasticity for elastomers may be less than 1,500 psi. The modulus of elasticity for silicones is typically between about 1,000 psi and about 2,500 psi, such as about 1,200 psi and about 1,600 psi, for example about 1,000 psi, about 1,100 psi, about 1,200 psi, about 1,300 psi, about 1,400 psi, about 1,500 psi. The modulus of elasticity for polysilanes is typically between about 1,000 psi and about 1,200 psi, such as about 1,200 psi and about 1,600 psi, for example about 1,000 psi, about 1,100 psi, about 1,200 psi. The modulus of elasticity for polysiloxanes is typically between about 1,000 psi and about 1,400 psi, such as about 1,100 psi and 1,200 psi, for example about 1,000 psi, about 1,100 psi, about 1,200 psi, about 1,300 psi, about 1,400 psi. The modulus of elasticity for polysilazanes is typically between about 1,000 psi and about 1,400 psi, such as about 1,200 psi and about 1,300 psi. In some aspects, low-modulus-of-elasticity is between about 500 psi and 3,000 psi, such as about 1000 psi and about 1500 psi, for example about 1,000 psi, about 1,100 psi, about 1,200 psi, about 1,300 psi, about 1,400 psi or about 1,500 psi. A flexible layer may include a suitable low-modulus-of-elasticity material capable of sustaining high (e.g., 100%-1000%) strain (or deformation) at low stresses (<1000 psi (pounds per square inch)). A flexible layer may be an oxidation-stable material and may include combinations of materials such as room-temperature vulcanizing (RTV) silicone rubber or a highly-deformable inorganic material. A flexible layer may include at least one electrically conductive material 402 (see FIG. 4) such as carbon black, carbon nanofibers, carbon nanotubes, a metal (e.g., metallic whiskers or other metallic material), or any other suitable electrically conductive material. The electrically conductive material may be present in an effective amount to enable electrical conductivity of a flexible layer. In some aspects, a flexible layer, such as flexible layer 208, has a thickness from about 0.5 micron to about 50 microns, such as about 1 micron to about 10 microns, such as about 3 microns to about 5 microns, for example about 3 microns, about 4 microns, about 5 microns. In some aspects, a dense barrier-coating structure 200 may include one or more additional flexible layers disposed on a first flexible layer, such as flexible layer 208.

As shown in FIG. 2, barrier-coating structure 200 further includes an oxygen-impervious, dense barrier layer 240 and a sol-gel layer 214. Sol-gel layer 214 has a first surface 216 and second surface 218 and is disposed between flexible layer 208 and barrier layer 240. Barrier layer 240 has a first surface 220 and a second surface 230. First surface 220 of barrier layer 240 is bonded with the second surface 218 of sol-gel layer 214. Sol-gel layers include silicon-based sol-gels such as alkoxysilane, chlorosilane, and Si—Zr-glycidyl sol-gels such as a BoeGel, such as Boegel-EPII™, developed by The Boeing Company, Seattle, Wash. Boegel-EPII™ composition is a combination of 3-glycidoxypropyltrimefhoxysilane (GTMS) and Zr (IV) n-propoxide reacted in the presence of an acid, such as acetic acid. Alkoxysilane includes allytrimethoxysilane, [3-(Diethylamino)propyl] trimethoxysilane, isobutyl(trimethoxy)silane, n-propyltriethoxysilane, tetramethyl orthosilicate, tetrapropyl orthosilicate, triethoxy(octyl)silane, triethoxyphenylsilane, triethoxyvinylsilane, trimethoxymethylsilane, trimethoxyphenylsilane, and mixtures thereof. Chlorosilane includes butyltrichlorosilane, ethyltrichlorosilane, methyltrichlorosilane, pentyltrichlorosilane, and mixtures thereof.

A component, such as a polymer, of a sol-gel may have one or more reactive substituents for contacting a surface of a barrier layer with a surface of a sol-gel, such as first surface 220 of barrier layer 240 with second surface 218 of sol-gel layer 214, and/or for bonding a surface of a flexible layer with a surface of a sol-gel, such as second surface 212 of flexible layer 208 with first surface 216 of sol-gel layer 214. A barrier layer may have one or more reactive substituents for bonding a surface of a barrier layer with a surface of a sol-gel, such as first surface 220 of barrier layer 240 with second surface 218 of sol-gel layer 214. Reactive substituents include polymer endcaps. Reactive substituents include phthalonitrile, phenylethynyl, glycidyl, anhydride, nadic, and amine. For example, a flexible layer has an amine-containing silicone (e.g., Xiameter from Dow Corning) and a sol-gel layer has a phthalonitrile-substituted silane. The sol-gel layer is deposited onto the barrier layer and the flexible layer is deposited onto the sol-gel layer, followed by co-curing, which promotes nucleophilic reaction of the amine moieties of the polymer at least at the second surface of the flexible layer with the electrophilic phthalonitrile moieties of the silane at least at the first surface of the sol-gel layer. Covalent bonding of the sol-gel layer with the flexible layer reduces or eliminates delamination of the flexible layer from the sol-gel layer and the barrier layer.

In some aspects, a flexible layer has a first polymer with reactive substituents at a first surface, such as first surface 210, and a second polymer with reactive substituents at a second surface, such as second surface 212. The reactive substituents of the first polymer may be different than the reactive substituents of the second polymer. A first surface of a flexible layer having a polymer with reactive substituents different from reactive substituents of a second polymer of the second surface promotes fine tuning of bonding/reactivity of a first surface, such as first surface 210, of a flexible layer with a first surface, such as first surface 204, of a PMC substrate, while simultaneously fine tuning of bonding/reactivity of a second surface, such as second surface 212, of a flexible layer with a first surface, such as first surface 216, of sol-gel layer 214. This dynamic flexible layer may be formed by gradient deposition of two more polymers with different reactive substituents onto a PMC substrate or a sol-gel-coated barrier layer.

In some aspects, a sol-gel layer has a first polymer with reactive substituents at a first surface, such as first surface 216, and a second polymer with reactive substituents at a second surface, such as second surface 218. A first surface of a sol-gel layer having a polymer with reactive substituents different from reactive substituents of a second polymer of the second surface of the sol-gel layer promotes fine tuning of bonding/reactivity of a first surface, such as first surface 216, of a sol-gel layer with a first surface, such as first surface 212, of a flexible layer, while simultaneously fine tuning of bonding/reactivity of a second surface, such as second surface 218, of a sol-gel layer with a first surface, such as first surface 220, of a barrier coating. This dynamic flexible layer may be formed by gradient deposition of two more polymers with different reactive substituents onto a barrier coating or a flexible layer-coated PMC substrate.

Additionally or alternatively, a second surface, such as second surface 212, of a flexible layer and/or a first surface, such as first surface 216, of a sol-gel layer may be treated with one of the following treatments or any other suitable treatment to promote bonding reactivity with a first surface, such as first surface 216, of a sol-gel layer with a second surface of a flexible layer: chemical etching to promote chemical compatibility between sol-gel layer and flexible layer; treating a surface of a flexible layer and/or a sol-gel layer with acid or base to enhance the reactivity of the surface; treating a surface with a polar or nonpolar compound to adjust surface polarity; functionalizing a surface by treating the surface with a reactant having functional groups to form a surface with reactive functional groups; abrading a surface; or a combination of such treatments to promote durability and effectiveness of the bond between a sol-gel layer and a flexible layer. The oxygen-impervious, dense barrier layer 240 may include any suitable metallic material and/or ceramic material. Each of the metallic materials and ceramic materials has a respective second coefficient of thermal expansion (CTE). The metallic material may include nickel, titanium, and alloys thereof. The CTE of nickel is 13.3 ppm/° C. The CTE of titanium is 8.9 ppm/° C. The CTEs of nickel alloys may be between about 10 ppm/° C. and about 20 ppm/° C. The CTEs of titanium alloys may be between about 8 ppm and about 10 ppm/° C. Some metals and alloys, like Invar 36 and Alloy 42 (both nickel-steel alloys), among others, may have CTEs between about 3 ppm/° C. and about 5 ppm/° C. The ceramic material may include ceramic thermal materials based on carbides, borides, nitrides, and/or oxides. The CTEs of ceramic carbides may be between about 3 ppm/° C. and about 7 ppm/° C. The CTEs of ceramic borides may be between about 5 ppm/° C. and about 10 ppm/° C. The CTEs of ceramic nitrides may be between about 3 ppm/° C. and about 10 ppm/° C. The CTEs of ceramic oxides may be between about 5 ppm/° C. and about 10 ppm/° C. The oxygen-impervious, dense barrier layer 240 that includes one or more ceramic-based layers can reduce thermal energy transfer to the PMC substrate to reduce nominal substrate temperature, which can increase the lifespan of the PMC. The oxygen-impervious, dense barrier layer 240 may have a thickness between about 1 micron and about 30 microns, such as about 2 microns and about 10 microns, for example about 1 micron, about 2 microns, about 3 microns, about 4 microns, about 5 microns. The flexibility of the flexible layer protects the respective bonds (i.e., the bond between the PMC substrate 202 and the flexible layer 208 and the bond between the flexible layer 208 and the sol-gel layer 214) when the first and second coefficients of thermal expansion (CTE) are unequal by allowing relatively large strains to be accommodated at low stress levels.

The use of a fully dense metallic and/or ceramic layer or layers as the dense barrier layer or layered coatings prevents oxygen diffusion. When the dense barrier layer is used in combination with the flexible, low-modulus-of-elasticity, or high-strain-capable intermediate flexible layer or layers and the sol-gel layer, differences in CTEs or strain properties of the dense barrier layer(s) and the PMC or HTPMC substrate can be accommodated to prevent delamination of the barrier layer(s) from the PMC or HTPMC substrate. The combination of the flexible layer and sol-gel layer mitigates the difference in the first and second coefficients of thermal expansion and reduces or eliminates the strain mismatch between the PMC substrate and a barrier layer, thus reducing or eliminating oxidation of the PMC. In addition, the reactivity between a flexible layer and sol-gel layer reduces or eliminates delamination of the barrier coating from the PMC. The sol-gel layer and/or flexible layer may have properties that provide the sol-gel layer to be well-bonded with a barrier layer and flexible layer or sol-gel layer and/or PMC substrate. These properties may include electrical conductivity to allow for electrodeposition, and/or chemical compatibility such as provided by chemical etching and the like, to provide strong bonding between a sol-gel layer with barrier layer and a flexible layer. The dense barrier-coating structure 200 provides high-temperature oxidation protection of the PMC at a temperature in a range of from about 350 degrees Fahrenheit to about 700 degrees Fahrenheit. In addition, the dense barrier-coating structure 200 provides an about 100-degrees-Fahrenheit temperature reduction of the PMC or HTPMC. The dense barrier-coating structure 200 may further include one or more additional oxygen-impervious, dense barrier layers disposed on the second surface 230 of the barrier layer 240. The dense barrier-coating structure 200 may be prepared or manufactured by electrodeposition, vacuum deposition, chemical deposition, vapor deposition, plasma spraying, or another suitable deposition or bonding process.

In some aspects, a first surface of a barrier layer, such as first surface 220 of barrier layer 240, is laser ablated to form a laser-ablated surface of the barrier layer. For example, first surface 220 is laser ablated before sol-gel layer 214 is deposited on first surface 220. Laser ablating a surface of a barrier layer promotes bonding of a barrier layer with a sol-gel layer and reduced delamination of a barrier layer from a barrier coating structure, such as barrier coating structure 200, by creating increased surface area on the barrier layer and/or promoting sol-gel penetration into at least a portion of the barrier layer. In some aspects, laser ablation of a surface of a barrier layer promotes oxidation of the surface of the barrier, which promotes adhesion of a sol-gel with the surface of the barrier layer. In some aspects, a laser for laser ablation of a barrier layer is a neodymium-doped yttrium aluminum garnet laser (Nd:YAG). A power level of the laser may be between about 2 watts (W) and about 10 W, such as about 4 W and about 8 W, for example about 6 W, such as 6.3 W. A frequency of the laser may be between about 5 kiloHertz (kHz) and about 100 kHz, such as about 15 kHz and about 50 kHz, for example about 25 kHz, about 30 kHz, about 35 kHz, about 40 kHz. A beam width of the laser may be between about 5 μm and about 100 μm, such as about 15 μm and about 45 μm, for example about 20 μm, about 25 μm, about 30 μm, about 35 μm. Scan speed of the laser may be between about 5 cm/sec and about 100 cm/sec, such as about 15 cm/sec and about 50 cm/sec, such as about 20 cm/sec and about 30 cm/sec, for example about 25 cm/sec such as 25.4 cm/sec. Number of passes of the laser may be between about 1 pass and about 100 passes, such as about 1 pass and about 10 passes, for example 1 pass, 2 passes, 3 passes, 4 passes, 5 passes. Line spacing of the laser may be between about 5 and about 100 micrometers, such as between about 15 and about 50 micrometers, such as between about 20 micrometers and about 30 micrometers, for example about 20 micrometers, about 25 micrometers, about 30 micrometers. In some aspects, a closer line spacing provides greater surface area of a barrier layer.

Figure 3:
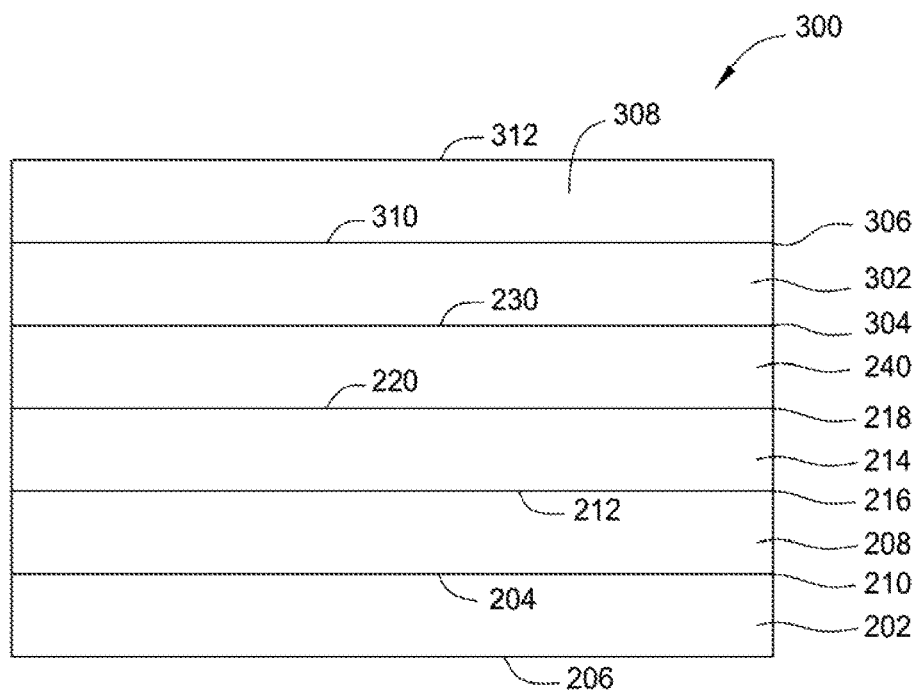
FIG. 3 is a barrier-coating structure according to an aspect of the present disclosure.

In some aspects, a dense barrier-coating structure has two or more oxygen-impervious, dense barrier layers. FIG. 3 is a barrier-coating structure according to an aspect of the present disclosure. As shown in FIG. 3, dense barrier-coating structure 300 includes PMC substrate 202, flexible layer 208, sol-gel layer 214, and oxygen-impervious, dense barrier layer 240, as discussed above. Dense barrier-coating structure 300 includes additional oxygen-impervious, dense barrier layers 302, 308 disposed on second surface 230 of oxygen-impervious, dense barrier layer 240. Oxygen-impervious, dense barrier layer 302 has a first surface 304 and a second surface 306. First surface 304 of oxygen-impervious, dense barrier layer 302 contacts second surface 230 of oxygen-impervious, dense barrier layer 240. Oxygen-impervious, dense barrier layer 308 has a first surface 310 and a second surface 312. First surface 310 of oxygen-impervious, dense barrier layer 308 contacts second surface 306 of oxygen-impervious, dense barrier layer 302. Dense barrier-coating structure 300 provides high-temperature oxidation protection of the PMC at a temperature, at least, between about 350 degrees Fahrenheit and about 700 degrees Fahrenheit. In addition, dense barrier-coating structure 300 provides an about 100-degrees-Fahrenheit temperature reduction of the PMC. Dense barrier-coating structure 300 may be prepared or manufactured by electrodeposition, vacuum deposition, chemical deposition, vapor deposition, plasma spraying, or another suitable deposition or bonding process.

Figure 4:
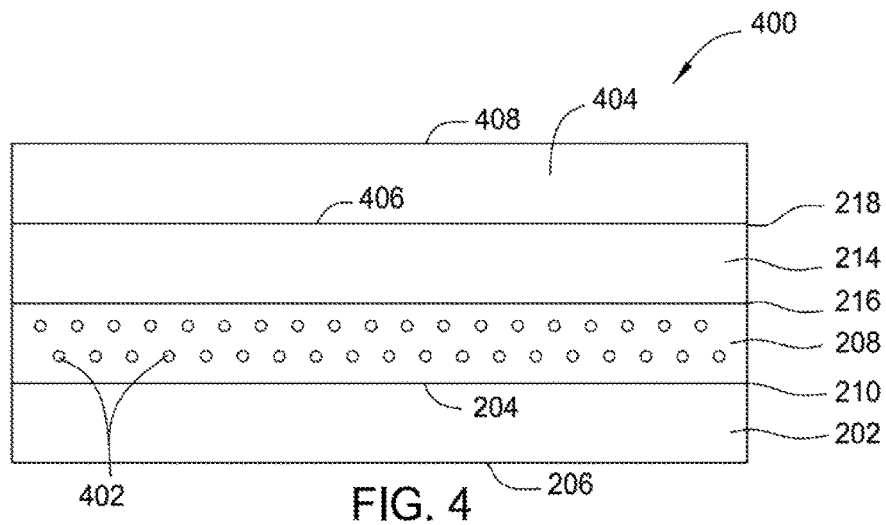
FIG. 4 is a barrier-coating structure according to an aspect of the present disclosure.

FIG. 4 is a barrier-coating structure according to an aspect of the present disclosure. As shown in FIG. 4, barrier-coating structure 400 includes PMC substrate 202. Barrier-coating structure 400 may be prepared by electrodeposition and may be used with the dry polymer-matrix composite (PMC) substrate 202 having a first coefficient of thermal expansion as discussed above. PMC substrate 202 has first surface 204 and second surface 206. Dense barrier-coating structure 400 further includes flexible layer 208 that is free of water. Flexible layer 208 has first surface 210 and second surface 212. First surface 210 of flexible layer 208 contacts first surface 204 of PMC substrate 202. As shown in FIG. 4, flexible layer 208 includes an electrically conductive material 402 in an effective amount to promote electrical conductivity of the flexible layer 208. When dense barrier-coating structure 400 is prepared by electrodeposition, flexible layer 208 should be made electrically conductive. When flexible layer 208 is electrically conductive, it facilitates electrodeposition directly onto flexible layer 208 with little or no surface treatment or preparation. Electrically conductive material 402 may include carbon black, carbon nanofibers, carbon nanotubes, metallic whiskers, metallic materials, or any other suitable electrically conductive material. Flexible layer 208 with electrically conductive material 402 may have a thickness between about 0.5 micron and about 50 microns, such as about 1 micron and about 10 microns, such as about 3 microns and about 5 microns, for example about 3 microns, about 4 microns, about 5 microns. Dense barrier-coating structure 400 further includes an oxygen-impervious, dense, metallic barrier layer 404 having a second coefficient of thermal expansion. Oxygen-impervious, dense, metallic barrier layer 404 may include nickel, titanium, and alloys thereof or any other suitable metallic material. Oxygen-impervious, dense, metallic barrier layer 404 has a first surface 406 and a second surface 408. Dense barrier-coating structure 400 further includes sol-gel layer 214 having a first surface 216 and a second surface 218. First surface 406 of oxygen-impervious, dense, metallic barrier layer 404 contacts second surface 218 of sol-gel layer 214. When the dense barrier layer is used in combination with the flexible, low-modulus-of-elasticity, or high-strain-capable intermediate flexible layer or layers and the sol-gel layer, differences in CTEs or strain properties of the dense barrier layer(s) and the PMC or HTPMC substrate can be accommodated to prevent delamination of the barrier layer(s) from the PMC or HTPMC substrate. The combination of the flexible layer and sol-gel layer mitigates the difference in the first and second coefficients of thermal expansion and reduces or eliminates the strain mismatch between the PMC substrate and a barrier layer, thus reducing or eliminating oxidation of the PMC. In addition, the reactivity between a flexible layer and sol-gel layer reduces or eliminates delamination of the barrier coating from the PMC. The sol-gel layer and/or flexible layer may have properties that provide the sol-gel layer to be well-bonded with a barrier layer and flexible layer or sol-gel layer and/or PMC substrate, as described above. The dense barrier-coating structure 400 may further include one or more additional oxygen-impervious, dense, metallic barrier layers. A bottom surface of a second dense, metallic barrier layer may contact second surface 408 of oxygen-impervious, dense, metallic barrier layer 404. Dense barrier-coating structure 400 provides high-temperature oxidation protection of the PMC at a temperature between about 350 degrees Fahrenheit and about 700 degrees Fahrenheit. In addition, dense barrier-coating structure 400 provides an about 100-degrees-Fahrenheit temperature reduction of the PMC.

Figure 5:
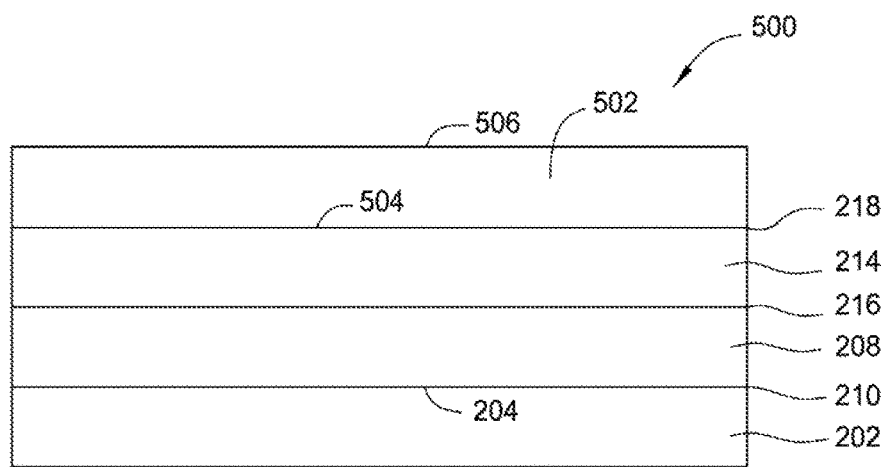
FIG. 5 is a barrier-coating structure according to an aspect of the present disclosure.

FIG. 5 is a barrier-coating structure according to an aspect of the present disclosure. As shown in FIG. 5, dense barrier-coating structure 500 includes dry polymer-matrix composite (PMC) substrate 202 having a first coefficient of thermal expansion. PMC substrate 202 has first surface 204 and second surface 206. Dense barrier-coating structure 500 includes flexible layer 208 that is substantially or completely free of water. Flexible layer 208 has first surface 210 and second surface 212. Dense barrier-coating structure 500 includes an oxygen-impervious, dense, ceramic barrier layer 502 having a second coefficient of thermal expansion. Ceramic barrier layer 502 may include ceramic thermal materials based on carbides, borides, nitrides, oxides, or any other suitable ceramic material. Oxygen-impervious, dense, ceramic barrier layer 502 has a first surface 504 and a second surface 506. Dense barrier-coating structure 500 includes a sol-gel layer 214 having a first surface 216 and a second surface 218. First surface 504 of the oxygen-impervious, dense, ceramic barrier layer 502 contacts second surface 218 of sol-gel layer 214, and first surface 216 of sol-gel layer 214 contacts second surface 212 of flexible layer 208. When the dense barrier layer is used in combination with the flexible, low-modulus-of-elasticity, or high-strain-capable intermediate flexible layer or layers and the sol-gel layer, differences in CTEs or strain properties of the dense barrier layer(s) and the PMC or HTPMC substrate can be accommodated to prevent delamination of the barrier layer(s) from the PMC or HTPMC substrate. The combination of the flexible layer and sol-gel layer mitigates the difference in the first and second coefficients of thermal expansion and reduces or eliminates the strain mismatch between the PMC substrate and a barrier layer, thus reducing or eliminating oxidation of the PMC. In addition, the reactivity between a flexible layer and sol-gel layer reduces or eliminates delamination of the barrier coating from the PMC. The sol-gel layer and/or flexible layer may have properties that provide the sol-gel layer to be well-bonded with a barrier layer and flexible layer or sol-gel layer and/or PMC substrate, as described above. Dense barrier-coating structure 500 may further include one or more additional oxygen-impervious, dense, ceramic barrier layers. A bottom surface of a second oxygen-impervious, dense, ceramic barrier layer may contact second surface 506 of the oxygen-impervious, dense, ceramic barrier layer 502. Dense barrier-coating structure 500 provides high-temperature oxidation protection of the PMC at a temperature between about 350 degrees Fahrenheit and about 700 degrees Fahrenheit. In addition, dense barrier-coating structure 500 provides an about 100-degrees-Fahrenheit temperature reduction of the PMC. Dense barrier-coating structure 500 may be prepared or manufactured by electrodeposition, vacuum deposition, chemical deposition, vapor deposition, plasma spraying, or another suitable deposition or bonding process.

Figure 6:
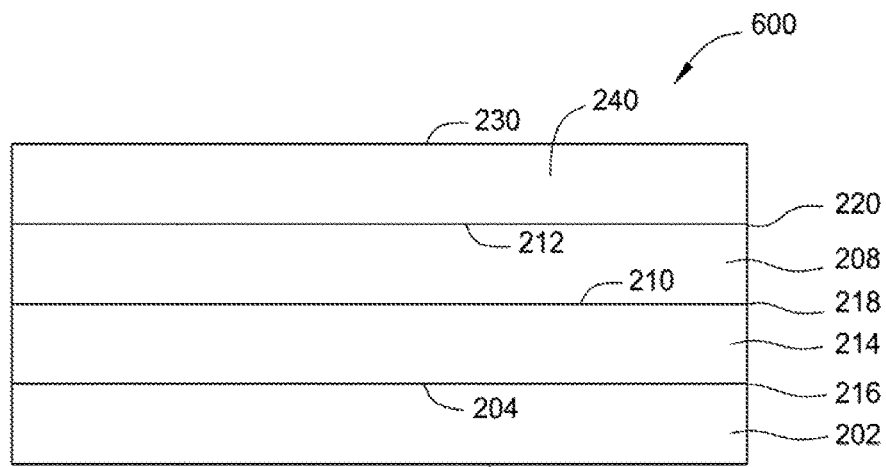
FIG. 6 is a barrier-coating structure according to an aspect of the present disclosure.

FIG. 6 is a barrier-coating structure according to an aspect of the present disclosure. The dense barrier-coating structure 600 of FIG. 6 is the same as the dense barrier coating structure 200 of FIG. 2, with the exception that flexible layer 208 of FIG. 6 is disposed adjacent barrier layer 240 and sol-gel layer 214. Furthermore, as shown in FIG. 6, sol-gel layer 214 is disposed adjacent flexible layer 208 and PMC substrate 202. Dense barrier-coating structure 600 may further include one or more additional oxygen-impervious, dense barrier layers disposed on second surface 230 of barrier layer 240, in a similar manner as the additional barrier layers shown in FIG. 3.

Figure 7:
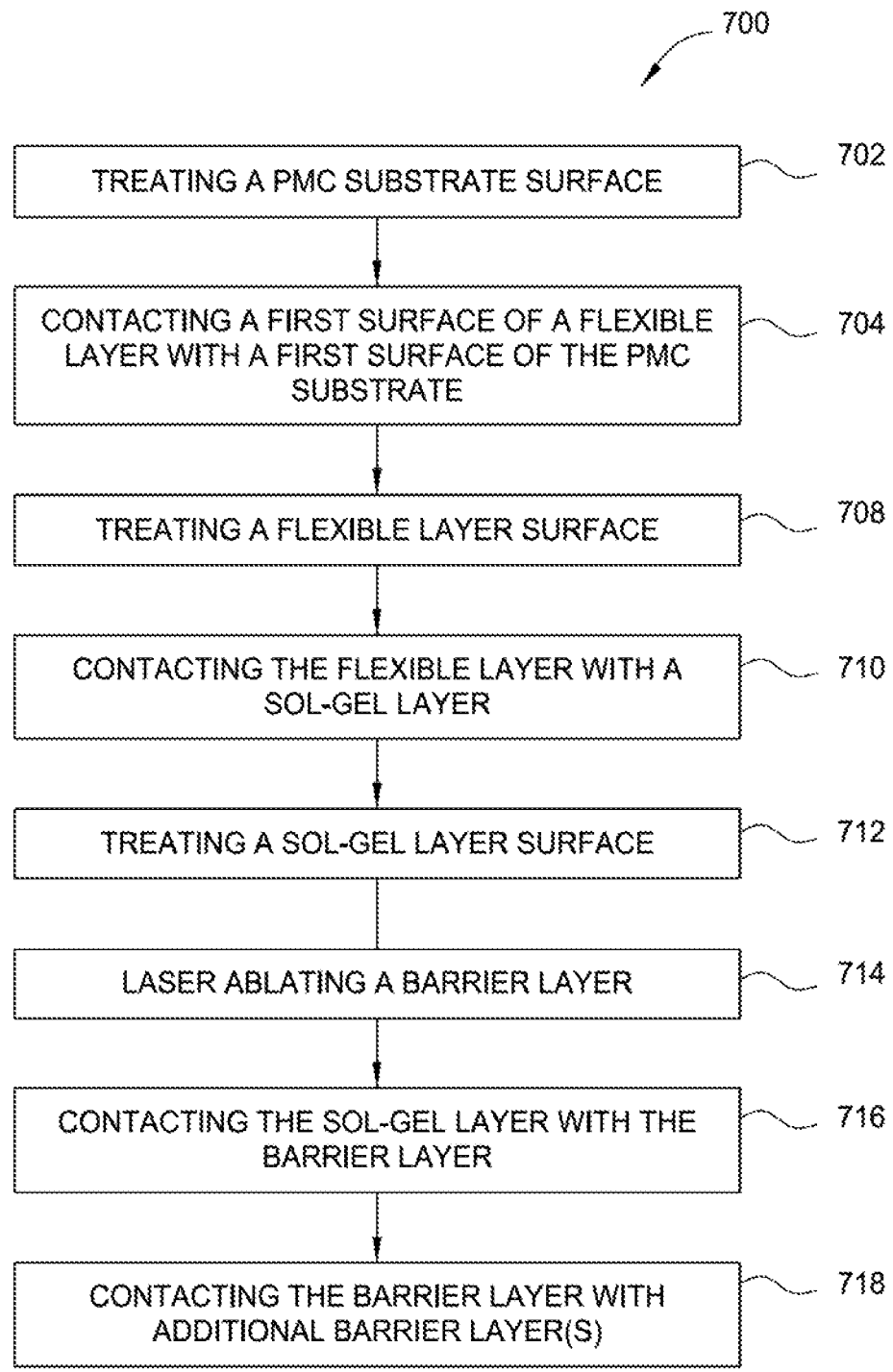
FIG. 7 is a flow diagram of a method of making a barrier-coating structure according to an aspect of the present disclosure.

FIG. 7 is a flow diagram of a method of making a barrier-coating structure according to an aspect of the present disclosure. Method 700 of making a barrier-coating structure (e.g., FIG. 1) provides high-temperature oxidation protection, such as a PMC for use with aircraft, spacecraft, watercraft, and other craft, engine and blown-flap, exhaust-washed structures, warm-structure components for high-performance supersonic, hypersonic, and space re-entry vehicle structures, and propulsion structures such as power-generation turbines, vehicle engines, alternative-energy applications, and related technologies. A dry polymer-matrix composite (PMC) substrate 202 (block 702) (e.g, FIGS. 2-5) has a first coefficient of thermal expansion. As shown in FIG. 7, method 700 includes treating a first surface of a PMC substrate (block 702), such as first surface 204 of PMC substrate 202, with a treatment such as chemical etching, abrading, or functionalizing, to promote bonding reactivity with a first surface of a flexible layer, such as first surface 210 of flexible layer 208 (e.g., FIGS. 2-5). Treatment may include chemical etching to promote chemical compatibility between a PMC substrate and a flexible layer; treating the surface with acid or base to enhance the reactivity of the surface; treating the surface with a polar or nonpolar compound to adjust surface polarity; functionalizing the surface by treating the surface with a reactant having functional groups to form a surface with reactive functional groups; abrading the surface; or a combination of such treatments to promote durability and effectiveness of the bond between the PMC substrate and the flexible layer or between adjacent flexible layers.

Method 700 further includes contacting a first surface of a flexible layer, such as first surface 210 of the flexible layer 208, that is free of water with a first surface of a PMC substrate, such as first surface 204 of PMC substrate 202, (block 704) (e.g. FIGS. 2-5). Contacting may include electrodeposition of a flexible layer onto a PMC substrate. A flexible layer may include an electrically conductive material, such as electrically conductive material 402 (e.g. FIG. 4) in an effective amount to enable electrical conductivity of the flexible layer. A flexible layer may further include a low-modulus-of-elasticity material such as elastomers, silicones, silanes, siloxanes, silazanes, or other suitable low-modulus-of-elasticity materials. Method 700 may further include heating a flexible layer and a PMC substrate to remove any moisture that may be adsorbed or absorbed in the flexible layer and the PMC substrate to prevent the volatilization of such moisture into superheated steam during operation and to prevent any delamination of the dense barrier-coating structure. A flexible layer and PMC substrate may be heated at an effective temperature for a sufficient period of time to remove any moisture. A heating temperature may be utilized according to the type(s) of material or materials of the flexible layer and/or the type(s) of material or materials of the PMC substrate.

Method 700 further includes treating a second surface of a flexible layer, such as second surface 212 of flexible layer 208, with a treatment such as chemical etching, abrading, or functionalizing, to promote bonding reactivity with a first surface of a sol-gel, such as first surface 216 of sol-gel layer 214, (block 708) (e.g., FIGS. 2-3). Treatment may include chemical etching to promote chemical compatibility between a flexible layer and a sol-gel layer; treating the surface with acid or base to enhance the reactivity of the surface; treating the surface with a polar or nonpolar compound to adjust surface polarity; functionalizing the surface by treating the surface with a reactant having functional groups to form a surface with reactive functional groups; abrading the surface; or a combination of such treatments to promote durability and effectiveness of the bond between the flexible layer and the sol-gel layer or between adjacent flexible layers. Method 700 further includes contacting a second surface of a flexible layer with a first surface of a sol-gel layer (Block 710). Contacting may include electrodeposition of a sol-gel layer onto a flexible layer.

Method 700 further includes treating a second surface of a sol-gel layer, such as second surface 218 of sol-gel layer 214, with a treatment such as chemical etching, abrading, or functionalizing, to promote bonding reactivity with a first surface of a barrier layer, such as first surface 220 of barrier layer 240, (Block 712) (e.g., FIGS. 2-3). Treatment may include chemical etching to promote chemical compatibility between a sol-gel layer and a barrier layer; treating the surface with acid or base to enhance the reactivity of the surface; treating the surface with a polar or nonpolar compound to adjust surface polarity; functionalizing the surface by treating the surface with a reactant having functional groups to form a surface with reactive functional groups; abrading the surface; or a combination of such treatments to promote durability and effectiveness of the bond between the sol-gel layer and the barrier layer or between adjacent sol-gel layers.

Method 700 further includes laser ablating a first surface of a barrier layer (Block 714), such as first surface 220 of barrier layer 240, to form a laser-ablated surface of the barrier layer. For example, first surface 220 may be laser ablated before contacting sol-gel layer 214 with first surface 220. Laser ablating a surface of a barrier layer promotes bonding of a barrier layer with a sol-gel layer and reduced delamination of a barrier layer from a barrier-coating structure, such as barrier-coating structure 200, by creating increased surface area on the barrier layer and/or promoting sol-gel penetration into at least a portion of the barrier layer. In some aspects, laser ablation of a surface of a barrier layer promotes oxidation of the surface of the barrier, which promotes adhesion of a sol-gel with the surface of the barrier layer. In some aspects, a laser for laser ablation of a barrier layer is a neodymium-doped yttrium aluminum garnet laser (Nd:YAG). A power level of the laser may be between about 2 watts (W) and about 10 W, such as about 4 W and about 8 W, for example about 6 W, such as 6.3 W. A frequency of the laser may be between about 5 kiloHertz (kHz) and about 100 kHz, such as about 15 kHz and about 50 kHz, for example about 25 kHz, about 30 kHz, about 35 kHz, about 40 kHz. A beam width of the laser may be between about 5 µm and about 100 µm, such as about 15 µm and about 45 µm, for example about 20 µm, about 25 µm, about 30 µm, about 35 µm. Scan speed of the laser may be between about 5 cm/sec and about 100 cm/sec, such as about 15 cm/sec and about 50 cm/sec, such as about 20 cm/sec and about 30 cm/sec, for example about 25 cm/sec such as 25.4 cm/sec. Number of passes of the laser may be between about 1 pass and about 100 passes, such as about 1 pass and about 10 passes, for example 1 pass, 2 passes, 3 passes, 4 passes, 5 passes. Line spacing of the laser may be between about 5 and about 100 micrometers, such as between about 15 and about 50 micrometers, such as between about 20 micrometers and about 30 micrometers, for example about 20 micrometers, about 25 micrometers, about 30 micrometers. In some aspects, a closer line spacing provides greater surface area of a barrier layer.

Method 700 further includes contacting a second surface of a sol-gel layer with a first surface of a barrier layer (Block 716). A first surface of a barrier layer may be laser ablated. Contacting may include electrodeposition of a barrier layer onto a sol-gel layer. The barrier layer may be an oxygen-impervious, dense barrier layer, such as barrier layer 240, and may include metallic materials or ceramic materials each having a respective second coefficient of thermal expansion. The flexibility of the flexible layer and sol-gel layer protects the respective bonds when the first and second coefficients of thermal expansion are unequal by allowing relatively large strains to be accommodated at low stress levels. Method 700 further includes contacting one or more additional barrier layers, such as oxygen-impervious, dense barrier layers 302, 308, (e.g., FIG. 3) with a second surface of a barrier layer (Block 718), such as second surface 230 of the oxygen-impervious, dense barrier layer 240, (e.g., FIG. 3).

Method 700 may also include curing and/or drying of one or more of a PMC substrate, a flexible layer, a sol-gel layer, and/or a barrier layer. For example, curing may be performed after block 704, block 710, and/or block 716. Curing may include co-curing two or more layers of a dense barrier-coating structure. Curing may be performed at a temperature between about 350 and about 700° F., such as between about 450 and about 700° F., such as between about 600° F. and about 680° F., for example about 600° F., about 620° F., about 640° F., about 660° F., about 680° F. Curing promotes reaction of reactive substituents for bonding a surface of a PMC substrate with a surface of a flexible layer, such as first surface 204 of PMC substrate 202 with first surface 210 of flexible layer 208. Curing also promotes reaction of reactive substituents for bonding a surface of a barrier layer with a surface of a sol-gel, such as first surface 220 of barrier layer 240 with second surface 218 of sol-gel layer 214, and/or for bonding a surface of a flexible layer with a surface of a sol-gel, such as second surface 212 of flexible layer 208 with first surface 216 of sol-gel layer 214. Reactive substituents include polymer endcaps. Reactive substituents include phthalonitrile, phenylethynyl, glycidyl, anhydride, nadic, and amine.

Figure 8:
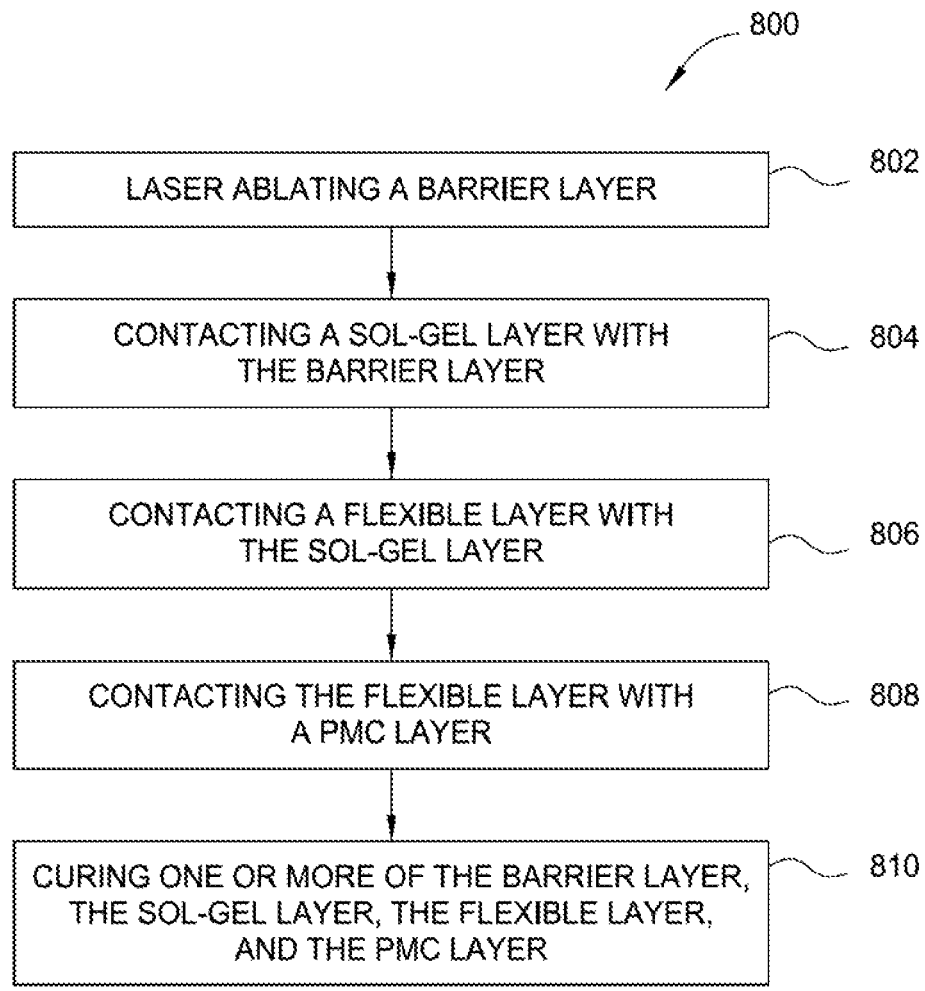
FIG. 8 is a flow diagram of a method of making a barrier-coating structure according to an aspect of the present disclosure.

FIG. 8 is a flow diagram of a method of making a barrier-coating structure according to an aspect of the present disclosure. Method 800 of making a barrier-coating structure (e.g., FIG. 1) provides high-temperature oxidation protection of a substrate, such as a PMC for use with aircraft, spacecraft, watercraft, and other craft, engine and blown-flap, exhaust-washed structures, warm-structure components for high-performance supersonic, hypersonic, and space re-entry vehicle structures, and propulsion systems such as power-generation turbines, vehicle engines, alternative-energy applications, and related technologies. Method 800 includes laser ablating a first surface of a barrier layer (Block 802), such as first surface 220 of barrier layer 240, to form a laser-ablated surface of the barrier layer. For example, first surface 220 may be laser ablated before a sol-gel layer 214 is deposited on first surface 220. Laser ablating a surface of a barrier layer promotes bonding of a barrier layer with a sol-gel layer and reduced delamination of a barrier layer from a barrier coating structure, such as barrier coating structure 200, by creating increased surface area on the barrier layer and/or promoting sol-gel penetration into at least a portion of the barrier layer. In some aspects, laser ablation of a surface of a barrier layer promotes oxidation of the surface of the barrier, which promotes adhesion of a sol-gel to the surface of the barrier layer. In some aspects, a laser for laser ablation of a barrier layer is a neodymium-doped yttrium aluminum garnet laser (Nd:YAG). A power level of the laser may be between about 2 watts (W) and about 10 W, such as about 4 W and about 8 W, for example about 6 W, such as 6.3 W. A frequency of the laser may be between about 5 kiloHertz (kHz) and about 100 kHz, such as about 15 kHz and about 50 kHz, for example about 25 kHz, about 30 kHz, about 35 kHz, about 40 kHz. A beam width of the laser may be between about 5 μm and about 100 μm, such as about 15 μm and about 45 μm, for example about 20 μm, about 25 μm, about 30 μm, about 35 μm. Scan speed of the laser may be between about 5 cm/sec and about 100 cm/sec, such as about 15 cm/sec and about 50 cm/sec, such as about 20 cm/sec and about 30 cm/sec, for example about 25 cm/sec such as 25.4 cm/sec. Number of passes of the laser may be between about 1 pass and about 100 passes, such as about 1 pass and about 10 passes, for example 1 pass, 2 passes, 3 passes, 4 passes, 5 passes. Line spacing of the laser may be between about 5 and about 100 micrometers, such as between about 15 and about 50 micrometers, such as between about 20 micrometers and about 30 micrometers, for example about 20 micrometers, about 25 micrometers, about 30 micrometers. In some aspects, a closer line spacing provides greater surface area of a barrier layer.

Method 800 further includes contacting a second surface of a sol-gel layer with a first surface of a barrier layer (Block 804). A first surface of a barrier layer may be laser ablated. Contacting may include electrodeposition of a sol-gel layer onto a barrier layer. The barrier layer may be an oxygen-impervious, dense barrier layer, such as barrier layer 240, and may include metallic materials or ceramic materials each having a respective second coefficient of thermal expansion. The flexibility of the flexible layer and sol-gel layer protects the respective bonds when the first and second coefficients of thermal expansion are unequal by allowing relatively large strains to be accommodated at low stress levels.

Method 800 further includes contacting a second surface of a flexible layer with a first surface of a sol-gel layer (Block 806). Contacting may include electrodeposition of a flexible layer onto a sol-gel layer. Method 800 further includes contacting a second surface of a PMC layer with a first surface of a flexible layer (Block 808). Contacting may include electrodeposition of a PMC layer onto a flexible layer.

Method 800 may also include curing and/or drying of one or more of a PMC substrate, a flexible layer, a sol-gel layer, and/or a barrier layer (block 810). For example, curing may be performed after block 804, block 806, and/or block 808. Curing may include co-curing two or more layers of a dense barrier-coating structure. Curing may be performed at a temperature between about 350 and about 700° F., such as between about 450 and about 700° F., such as between about 600° F. and about 680° F., for example about 600° F., about 620° F., about 640° F., about 660° F., about 680° F. Curing promotes reaction of reactive substituents for bonding a surface of a PMC substrate with a surface of a flexible layer, such as first surface 204 of PMC substrate 202 with first surface 210 of flexible layer 208. Curing also promotes reaction of reactive substituents for bonding a surface of a barrier layer with a surface of a sol-gel, such as first surface 220 of barrier layer 240 with second surface 218 of sol-gel layer 214, and/or for bonding a surface of a flexible layer with a surface of a sol-gel, such as second surface 212 of flexible layer 208 with first surface 216 of sol-gel layer 214. Reactive substituents include polymer endcaps. Reactive substituents include phthalonitrile, phenylethynyl, glycidyl, anhydride, nadic, and amine.

Method 800 may also include treating a surface of a barrier layer, a sol-gel layer, a flexible layer, and/or a PMC layer after formation of said layer to promote bonding reactivity with an adjacent layer. Treatment may include chemical etching to promote chemical compatibility between a layer and an adjacent layer; treating the surface with acid or base to enhance the reactivity of the surface; treating the surface with a polar or nonpolar compound to adjust surface polarity; functionalizing the surface by treating the surface with a reactant having functional groups to form a surface with reactive functional groups; abrading the surface; or a combination of such treatments to promote durability and effectiveness of the bond between a layer and adjacent layer(s).

Overall, dense barrier layer(s) and/or coating layers and methods of the present disclosure provide dense barrier layer(s) and/or coating layers that are completely or substantially impervious to oxygen as well as flexible layer or layers providing accommodation of CTE differential between the dense barrier layer(s) and PMC substrate. Dense barrier layer(s) and/or coating layers and methods of the present disclosure further provide delamination protection of dense barrier layer(s) and PMC substrate and, accordingly, protection of a PMC substrate from harsh environmental conditions which would otherwise result in thermo-oxidation at elevated temperatures. Dense barrier layer(s) and/or coating layers and methods of the present disclosure provide one or more of the following advantages: provide a dense barrier-coating structure and method that is durable and that protect PMCs and HTPMCs from thermo-oxidation; provide a dense barrier-coating structure and method that prevents oxygen ingression into the PMC or HTPMC to prevent oxidation using an intermediate layer or layers that flexibly bond(s) the barrier coating to the PMC or HTPMC while accommodating differences in coefficients of thermal expansion (CTEs) to prevent the coating from cracking, spalling, or delamination from the substrate at elevated temperatures; provide a dense barrier-coating structure and method that reduces thermal energy transfer to the PMC or HTPMC substrate to reduce nominal substrate temperature, which increases the lifespan of the PMC or HTPMC; provide a dense barrier-coating structure and method that prevents oxidation of PMCs and HTPMCs at elevated temperatures to extend their lifetime from between about 1,000 hours to 15,000 hours to, for example between about 10,000 hours to 15,000 hours, and even for example about 60,000 hours; provide a dense barrier-coating structure and method that results in lowering the temperature of structures adjacent to the barrier-coated PMCs and HTPMCs, which decreases the need for insulation materials, which, in turn, lowers costs and increases weight savings; provide a dense barrier-coating structure and method that can be used with aircraft, spacecraft, watercraft, and other craft, engine and blown-flap, exhaust-washed structures, warm-structure components for high-performance supersonic, hypersonic, and space re-entry vehicle structures, and propulsion structures such as power-generation turbines, vehicle engines, alternative-energy applications, and related technologies; provide dense barrier-coating structures and methods that provide commercial and military use in a wide variety of long-duration, high-temperature, and high-flow-rate environments; provide dense barrier-coating structures that are impermeable to oxygen, durable and resistant to cracking, spalling, delamination, corrosion, and erosion during normal use, thermo-oxidatively stable at an application temperature, and applicable in an affordable manner; and provide dense barrier-coating structures and methods that may reduce the structural weight of the barrier-coated PMCs and HTPMCs by about 20 wt % to about 25 wt %, thus resulting in longer range, lower fuel costs, higher cargo capacities, and improved operational performance capability.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope of the described aspects. The terminology used herein was chosen to, for example, best explain the principles of the aspects, the practical application or technical improvement over technologies found in the marketplace, or to enable others of ordinary skill in the art to understand the aspects disclosed herein.

What is claimed is:

1. A barrier-coating structure comprising:
   a polymer-matrix composite comprising a first surface and a second surface;
   a flexible layer comprising an electrically conductive material and having a first surface and a second surface;
   a sol-gel layer comprising a first surface and a second surface, the first surface of the sol-gel layer contacting the second surface of the flexible layer; and
   a barrier layer comprising a first surface and a second surface.

2. The barrier-coating structure of claim 1, wherein the polymer-matrix composite and/or flexible layer comprises one or more reactive substituents selected from the group consisting of phthalonitrile, phenylethynyl, glycidyl, anhydride, amine, nadic, and combinations thereof.

3. The barrier-coating structure of claim 1, wherein the sol-gel and/or the flexible layer comprises one or more reactive substituents selected from the group consisting of phthalonitrile, phenylethynyl, glycidyl, anhydride, amine, nadic, and combinations thereof.

4. The barrier-coating structure of claim 1, wherein the sol-gel and/or the barrier layer comprises one or more reactive substituents selected from the group consisting of phthalonitrile, phenylethynyl, glycidyl, anhydride, nadic, amine, and combinations thereof.

5. The barrier-coating structure of claim 1, wherein the first surface of the flexible layer comprises a first polymer comprising reactive substituents and the second surface of the flexible layer comprises a second polymer comprising reactive substituents, wherein the reactive substituents of the first polymer are not the same as the reactive substituents of second polymer.

6. The barrier-coating structure of claim 5, wherein the reactive substituents of the first polymer and the second polymer are selected from the group consisting of phthalonitrile, phenylethynyl, glycidyl, anhydride, nadic, amine, and combinations thereof.

7. The barrier-coating structure of claim 1, wherein the first surface of the sol-gel layer comprises a first polymer comprising reactive substituents and the second surface of the sol-gel layer comprises a second polymer comprising reactive substituents, wherein the reactive substituents of the first polymer are not the same as the reactive substituents of the second polymer.

8. The barrier-coating structure of claim 7, wherein the reactive substituents of the first polymer and the second polymer are selected from the group consisting of phthalonitrile, phenylethynyl, glycidyl, anhydride, nadic, amine, and combinations thereof.

9. The barrier-coating structure of claim 1, wherein the polymer-matrix composite has a first coefficient of thermal expansion and the barrier layer has a second coefficient of thermal expansion.

10. The barrier-coating structure of claim 1, wherein the polymer-matrix composite is selected from the group consisting of a polyimide high-temperature polymer-matrix composite, a bismaleimide high-temperature polymer-matrix composite, an inorganic polymer, a polybenzoxazole, a polybenzoxazine, a polyetheretherketone, and combinations thereof.

11. The barrier-coating structure of claim 1, wherein the flexible layer is selected from the group consisting of an elastomer, a silicone, a silane, a siloxane, a silazane, and combinations thereof.

12. The barrier-coating structure of claim 1, wherein the electrically conductive material is selected from the group consisting of carbon black, carbon nanofibers, carbon nanotubes, a metal, and combinations thereof.

13. The barrier-coating structure of claim 1, wherein the flexible layer has a thickness from about 0.5 micron to about 50 microns.

14. The barrier-coating structure of claim 1, wherein the sol-gel layer is a silicon-zirconium-glycidyl sol-gel, alkoxysilane, chlorosilane, or mixtures thereof.

15. The barrier-coating structure of claim 1, wherein the barrier layer has a thickness between about 1 micron and about 30 microns.

16. A barrier-coating structure, comprising:
    a polymer-matrix composite comprising a first surface and a second surface;
    a flexible layer comprising a first surface and a second surface;
    a sol-gel layer comprising a first surface and a second surface, the first surface of the sol-gel layer contacting the second surface of the flexible layer; and
    a barrier layer comprising a first surface and a second surface, wherein the first surface of the barrier layer is a laser-ablated surface.

17. The barrier-coating structure of claim 16, wherein the second surface of the sol-gel layer penetrates the first surface of the barrier layer.

18. The barrier-coating structure of claim 16, wherein the flexible layer further includes an electrically conductive material.

19. A method of making a barrier-coating structure, the method comprising:
    laser ablating a first surface of a barrier layer to form a laser-ablated barrier surface;
    contacting a first surface of a sol-gel layer with the laser-ablated barrier surface;

contacting a first surface of a flexible layer with a second surface of the sol-gel layer; and contacting a first surface of a polymer-matrix composite layer with a second surface of the flexible layer.

20. The method of claim 19, further comprising curing at least one of the barrier layer, the sol-gel layer, the flexible layer, and the polymer-matrix composite layer.

* * * * *